United States Patent [19]

Frihart et al.

[11] Patent Number: 5,424,371

[45] Date of Patent: * Jun. 13, 1995

[54] ADHESIVE OF AMINE-TERMINATED, PIPERAZINE-CONTAINING POLYAMIDE AND EPOXY RESIN

[75] Inventors: Charles R. Frihart, Lawrenceville, N.J.; Ronald L. Gordon, Springfield, Ga.

[73] Assignee: Union Camp Corporation, Princeton, N.J.

[*] Notice: The portion of the term of this patent subsequent to Jan. 31, 2012 has been disclaimed.

[21] Appl. No.: 197,729

[22] Filed: Feb. 17, 1994

[51] Int. Cl.$^6$ .................. C08L 77/06; C08L 77/08
[52] U.S. Cl. ..................... 525/420.5; 525/423
[58] Field of Search ................... 525/420.5, 423

[56] References Cited

U.S. PATENT DOCUMENTS

| | | | |
|---|---|---|---|
| 2,585,115 | 2/1952 | Greenlee | 260/47 |
| 2,705,223 | 3/1955 | Renfrew et al. | 260/18 |
| 2,707,708 | 5/1955 | Wittcoff | 260/18 |
| 2,867,592 | 1/1959 | Morris et al. | 260/18 |
| 2,881,194 | 4/1959 | Peerman et al. | 260/404.5 |
| 2,890,184 | 6/1959 | Foerster | |
| 2,899,397 | 8/1959 | Aelony et al. | 260/18 |
| 2,930,773 | 3/1960 | Renfrew et al. | 260/18 |
| 2,999,825 | 9/1961 | Floyd et al. | 260/18 |
| 2,999,826 | 9/1961 | Peerman et al. | 260/18 |
| 3,062,773 | 11/1962 | Rogier | 260/42 |
| 3,257,342 | 6/1966 | Kwong | 260/18 |
| 3,288,664 | 11/1966 | Hoppe | 156/310 |
| 3,377,303 | 4/1968 | Peerman et al. | 528/341 |
| 3,449,278 | 6/1969 | McKay et al. | 260/23 |
| 3,488,665 | 1/1970 | MacGrandle et al. | 12/146 |
| 3,558,742 | 1/1971 | Schmid et al. | 260/830 |
| 3,578,727 | 5/1971 | Battersby et al. | 260/830 |
| 3,678,127 | 7/1972 | Schmid et al. | 260/830 P |
| 3,945,964 | 3/1976 | Hastings et al. | 260/29.6 NR |
| 3,956,208 | 5/1976 | Hoki et al. | 260/18 PN |
| 4,070,225 | 1/1978 | Batdorf | 156/311 |
| 4,082,708 | 4/1978 | Mehta | 260/18 |
| 4,128,525 | 12/1978 | Yeakey et al. | 260/29.1 R |
| 4,461,879 | 7/1984 | Bauer et al. | 525/423 |
| 4,698,396 | 10/1987 | Drawert et al. | 525/420.5 |
| 4,957,979 | 9/1990 | Albini et al. | 525/424 |
| 4,975,498 | 12/1990 | Frihart | 525/426 |
| 5,025,043 | 6/1991 | Smith | 523/326 |

FOREIGN PATENT DOCUMENTS

| | | |
|---|---|---|
| 0157478 | 10/1985 | European Pat. Off. |
| 59-71339 | 4/1984 | Japan |
| 62-148582 | 7/1987 | Japan |
| 63-10643 | 1/1988 | Japan |
| 1530790 | 11/1974 | United Kingdom |

OTHER PUBLICATIONS

American Chemical Society, Chemical Abstracts 67: 74090; Oct. 1967 U.S.

Patent Abstracts of Japan, Unexamined Applications 61-73734(A), Aug. 1986 Japan.

Patent Abstracts of Japan, Unexamined Applications 58-40378(A), May 1983 Japan.

*Primary Examiner*—Robert E. Sellers
*Attorney, Agent, or Firm*—Woodcock Washburn Kurtz Mackiewicz & Norris

[57] ABSTRACT

A thermoset adhesive composition comprising a thermoplastic, substantially amine terminated piperazine-containing and/or polyetherdiamine-containing polyamide resin, and further comprising an epoxy resin.

12 Claims, No Drawings

ADHESIVE OF AMINE-TERMINATED, PIPERAZINE-CONTAINING POLYAMIDE AND EPOXY RESIN

This application is related to U.S. patent application No. 238,583, filed May 5, 1994, and now U.S. Pat. No. 5,385,986, which is a continuation of application Ser. No. 824,748, filed Jan. 17, 1992, now abandoned, which is a continuation of application Serial No. 479,830, filed Feb. 14, 1990, now abandoned.

BACKGROUND OF THE INVENTION

1. Field of the Invention

This invention relates to new and improved amine-terminated piperazine or polyetherdiamine containing polyamide and epoxy resin compositions useful as hot melt adhesives which are curable. In particular it relates to polyamide-epoxy compositions which possess good initial (green) adhesive and cohesive strength properties. It also relates to the cured hot melt adhesives of the invention which possess improved properties, including excellent bond strength, increased water, heat and solvent resistance and increased flexibility and ductility. This invention further relates to the process of manufacture of the hot melt adhesives, both cured and uncured.

2. Brief Description of the Prior Art

It is known that dimer-based polyamides are useful for curing epoxy resins, as in U.S. Pat. Nos. 3,062,773 (Rogier) 2,999,826 (Peerman et al.), 2,930,773 (Renfrew et al.), 2,899,397 (Aelony et al.), 2,890,184 (Foerster), 2,881,194 (Peerman et al.), and 2,707,708 (Wittcoff), however, the polyamides used are not solids at ambient temperatures, but are liquids having a high amine number. The liquid polyamides are mixed with liquid epoxies and allowed to cure. The products possess little cohesive strength until sufficient curing occurs. Certain of the cured products are useful as adhesives, but have shortcomings in that such adhesives are usually rigid and possess limited ductility and flexibility.

It has been known to blend a thermoplastic polyamide with an epoxy resin to produce an adhesive as in U.S. Pat. No. 2,867,592 (Morris et al.). However, the amount of epoxy resin added was limited to a proportion effective to link small numbers of polyamide resin molecules together without providing sufficient cross-linking to cause curing. Thus, such a blend was not a thermoset; it was not capable of being cured to render it infusible.

U.S. Pat. No. 3,488,665 (MacGrandle et al.) teaches a process wherein polyamides are blended with epoxies to provide a product which cures after application to the substrate; however, the product is used to provide a hard, stiffer coating for flexible sheet material. Curable adhesives have been made using polyamide resins and epoxy resins as in U.S. Pat. No. 2,705,223 (Renfrew et al.). But the Renfrew compositions possess inferior properties when applied as adhesives. For example, the Renfrew compositions do not possess good adhesive strength upon cure and provide limited working time after the mixing of the components. In addition, such compositions exhibit poor flexibility, and poor adhesive resistance to heat, water and organic solvents when applied to substrates at ambient temperature.

U.S. Pat. No. 4,082,708 (Mehta) teaches an adhesive system comprising an epoxy resin and a polyamide wherein the polyamide is derived substantially from primary and tertiary amines; specifically, the Mehta polyamides are derived from 1,4-bis-primary amino lower alkyl piperazine having terminal primary amine groups. Although it is suggested that secondary amines can be utilized in making the polyamides as chain extenders and flexibilizers, it is taught that the secondary amines are less desirable reactants and should be buried within the polyamide structure.

The present invention provides an improvement over the prior art in that it provides a two component curable hot melt polyamide with good adhesive properties and with the important added ability to be cured. Thus, it provides hot melt adhesives which have good initial strength properties, but, in addition, which are curable to a state where they have improved adhesive and cohesive strength and gain resistance to remelting (or softening with heat), solvent attack and moisture damage. These characteristics are especially valuable in hot melt adhesives which must perform under challenging conditions of temperature, humidity, and mechanical stress. In addition, the adhesives of the present invention possess greater ductility, flexibility and longer open assembly times. Consequently, the adhesives are easier to employ. The adhesives can be applied to a wide variety of substrates, including substrates at ambient temperature and various types of plastics.

SUMMARY OF THE INTENTION

The present invention provides an improved thermoset adhesive composition, both cured and uncured, which comprises a thermoplastic, substantially amine-terminated piperazine or polyetherdiamine containing polyamide resin, wherein the polyamide resin has an amine plus acid number greater than about 1 and less than about 50 and has an excess of amine groups to acid groups, and further comprises an epoxy resin, wherein the epoxy resin has at least two epoxy groups per molecule of epoxy resin, and where the initial ratio of epoxy groups of the epoxy resin to the free amine groups of the polyamide resin is greater than about 1 to 1 and less than about 10 to 1.

The invention also comprises the method for the production of the cured and uncured thermoset adhesive. The invention also comprises the cured thermoset adhesive made by curing the substantially amine-terminated piperazine or polyetherdiamine containing polyamide-epoxy resin composition, and the method for curing the polyamide-epoxy resin composition. The invention also comprises the method of bonding at least a first and second substrate.

Prior to cure, the product of the invention is an effective hot melt adhesive with good adhesive strength and good ductility. After cure, the product of the invention is more cohesive and adhesive, more ductile and flexible, more heat resistant, more solvent resistant and more moisture resistant.

DETAILED DESCRIPTION OF THE INVENTION

The invention is an improved thermoset adhesive composition comprising a thermoplastic, substantially amine-terminated polyamide that contains a piperazine-containing polyamine or a polyetherdiamine or a mixture of both. The polyamide resin has an amine plus acid number greater than about 1 and less than about 50 and also has an excess of amine groups to acid groups. The adhesive composition further comprises an epoxy resin having at least two epoxy groups per molecule of epoxy resin. The initial ratio of epoxy groups of the epoxy resin to the free amine groups of the polyamide resin is greater than about 1 to 1 and less than about 10 to 1. Thus, each amine group becomes reacted with an epoxy group leaving additional epoxy groups unreacted in sufficient numbers to enable the curing to occur. Accordingly, when using a typical epoxy with an equivalent weight of 190 grams per epoxy group, the weight of epoxy is from about 1% to about 20% of the polyamide for the stoichiometric case.

The compositions of the invention, most broadly, can be made using any thermoplastic aminoamide polymer. In a preferred group of compositions within the invention, the polyamide should have an amine plus acid number greater than about 1 and less than about 50 and also have an excess of amine to acid groups. Preferably, the polyamide should have an amine plus acid number greater than about 2 and less than about 30 and most preferably, less than about 20, (the amine functionality is expressed in a conventional manner in terms of mg. of equivalent KOH/g of sample.) Preferably, the number of amine groups of the polyamide resin should exceed the number of acid groups by about 2% to about 30%. With lower functionality, the groups are too dispersed to cure sufficiently. With higher functionality, there is risk of premature gelation or at least excessive viscosity. For better initial adhesive strength quality, the polyamides should also have a softening point above about 50° C., preferably between about 75° C. to about 200° C.

In the preferred group of compositions within the invention, the polyamides are made from polymerized fatty acids, linear dicarboxylic acids and a linear or branched aliphatic polyamine. A linear monocarboxylic acid may be added in addition to or instead of the linear dicarboxylic acid to control the molecular weight.

The polyamide compositions of the invention can be made using 30–100 percent equivalent (i.e., 30–100% of the total acid groups present in the mixture before polymerization are derived from the dimer component) of any polymerized, unsaturated fatty acid or the reaction of an acrylic acid with unsaturated fatty acids. Preferably, the polyamide compositions are made using 50–90 equivalent percent of the fatty acid. Most preferable is a polymerized unsaturated fatty acid having a dimeric fatty acid content greater than 65 percent by weight. One particularly suitable material is the material known commercially as dimer acid or non-linear dicarboxylic acid, especially non-linear dicarboxylic acids having 6 to 22 carbon atoms.

The term "dimer acid" is in common use in the resin field and refers to polymeric or oligomeric fatty acids typically made from addition polymerization of unsaturated tall oil fatty acids. These polymeric fatty acids typically have the composition 0–10% $C_{18}$ monobasic acids, 60–95% $C_{36}$ dibasic acids, and 1–35% $C_{54}$ tribasic and higher polymeric acids. The relative ratios of monomer, dimer, trimer and higher polymer in unfractionated "dimer acid" are dependent on the nature of the starting material and the conditions of polymerization and distillation. Methods for the polymerization of unsaturated fatty acids are described, for example, in U.S. Pat. No. 3,157,681. The dimer content is also controlled by the fractionation conditions used to reduce the monomer, trimer and higher polymer components.

Linear dicarboxylic acids may be added in amounts up to about 70 equivalent percent, preferably 10–50 equivalent percent, and have from 6 to about 22 carbon atoms. Such preferred linear dicarboxylic acids include oxalic, malonic, succinic and suberic acids. Most preferred include adipic, azelaic, sebacic and dodecanedioic acids.

Monocarboxylic acids may be added in amounts up to about 10 equivalent percent to control molecular weight. Preferred monocarboxylic acids are linear and have 2 to 22 carbon atoms. Most preferred are stearic, tall oil fatty and oleic acids.

Linear or branched aliphatic polyamines are added in amounts of from about 12 equivalent percent up to about 100 equivalent percent, based upon total acid groups added to the polymerization, more preferably from about 22 equivalent percent up to about 95 equivalent percent, and most preferably from about 22 equivalent percent to about 75 equivalent percent, and have from 2 to about 12 carbon atoms. Preferred polyamines include diaminopropane, diaminobutane, diaminopentane, methylpentamethylenediamine, methylnonanediamine, diethylenetriamine, triethylenetetraamine, and tetraethylenepentaamine. Most preferred are ethylenediamine and hexamethylenediamine. Xylenediamine, bis(aminoethyl)benzene, bis(aminomethyl)cyclohexane, and dimer diamine (diamine made from dimer acid) are also useful. Monoamines may also be added in an amount up to 10 equivalent percent to control molecular weight and functionality. Mixtures of polyamines can also be used to obtain a good balance of properties.

The polyamide further comprises a piperazine-containing and/or polyetherdiamine-containing polyamine. The amine-terminated, piperazine-containing polyamide resin as utilized herein signifies a polyamide resin made from piperazine-containing polyamines having only secondary amine groups, i.e., groups of the formula (—NRH), and/or tertiary amine groups, i.e., groups of the formula (—NR$_3$) and excludes those having primary amine groups, i.e., groups of the formula (—NH$_2$). The resulting polyamide can have significant amounts of terminal secondary amine groups.

Suitable piperazine-containing polyamines provide an adhesive which will bond to many different substrates. Piperazine-containing polyamines are added in amounts of from about 7 up to about 90 equivalent percent, and more preferably from 27 to 80 equivalent percent. Examples of suitable piperazine-containing polyamines include piperazine, 1,2-di(1-piperazinyl)propane, 1,3-di-(1-piperazinyl)propane, 1,2-di-(1-piperazinyl)ethane, 1,4-di-(1-piperazinyl)butane, N-hydroxyethylpiperazine. Most preferred, because of effectiveness in lengthening the adhesive's open assembly time and giving good adhesive properties are piperazine and 1,3-di-(1-piperazinyl)propane.

Polyetherdiamines provide products with better flow properties. Polyetherdiamines are added in amounts of from 2 to 60 equivalent percent, and more preferably from 5 to 40 equivalent percent. The most preferred polyetherdiamines include diamines made from propylene oxide polymers having molecular weights of from 100 to about 8000, diamines made from ethylene oxide polymers having molecular weights of from 100 to about 8000, and diamines made from ethylene oxide-propylene oxide polymers having molecular weights of from 100 to about 8000. Other suitable polyetherdiamines include triamines made from propylene oxide polymers or ethylene oxide polymers and having molecular weights of from 100 to about 8000.

Suitable polyamides are commercially available, for example, as UNI-REZ 2636, 2643, 2646 and 2648 (commercially available from Union Camp Corporation, Wayne, N.J.). Alternatively, the preparation of members of this class of piperazine-containing polyamides from dimerized fatty acid is described by Peerman, et al. in U.S. Pat. No. 3,377,303 (1968).

The present invention is applicable to epoxy resins having two or more epoxy groups per molecule of epoxy resin. The preferred epoxy resins are multifunctional, that is, they have a functionality equal to or greater than 2, in order to develop good heat resistance. The most preferred epoxy resins have from 2.2 to 8 epoxy groups per molecule. The epoxy compositions which may be used for curing are generally linear epoxies based upon the diglycidyl ether of bisphenol A or bisphenol A oligomers, or branched types based upon the multiglycidyl ethers of phenolformaldehyde or cresol-formaldehyde resins, or epoxidized olefins, including unsaturated fatty oils. The most preferred epoxy resins are multifunctional epoxy novalac resins such as the D.E.N. epoxy novalac resins sold by The Dow Chemical Company (Midland, Mich.). D.E.N. 431 has an average of 2.2 epoxy groups per molecule, D.E.N. 438 has an average functionality of 3.6, and D.E.N. 439 resin has an average functionality of 3.8.

It is preferred if the initial (i.e., prior to mixing) ratio of epoxy groups of the epoxy resin to the free amine groups of the polyamide resin is greater than about 1 to 1 and less than about 10 to 1. It is more preferred if the ratio of epoxy groups to free amine groups is greater than about 1 to 1 and less than about 5 to 1. The most preferred ratio of epoxy groups to free amine groups is greater than about 2 to 1 and less than about 5 to 1.

The application and curing of the polyamide-epoxy resin composition is effected very simply. The polyamide and epoxy resin may be melted separately, subsequently mixed together and then coated upon the substrate as a molten mixture. Alternatively, one of the components may be melted first and then the other component admixed with it. The reaction temperature will generally not exceed 190° C., since at higher temperatures some cracking or premature polymerization of the reaction product will occur. Of course, a coating of the molten thermoset adhesive composition may be applied upon any or all areas or surfaces of one or more substrates.

The method for bonding at least a first and second substrate comprises the steps of coating one surface of the first substrate with the molten thermoset adhesive composition of the present invention, contacting the second substrate to the adhesive coated surface of the first substrate, and allowing the adhesive to cure. The thermoset adhesive composition will cure at room temperature; alternatively, pressure and/or heat may be applied to the first and second substrates after contacting the second substrate to the adhesive coated surface of the first substrate in order to accelerate the cure. The curing temperature will generally be between about 10° C. and about 100° C. and the times from on the order of 2 hours at the higher temperature to approximately 2 weeks at the lower temperature. The thermoset adhesive composition may be applied to a wide variety of substrates which require an adhesive of high strength, durability and resistance such as, for example, vinyl, polycarbonate, polystyrene, or wood.

The resultant product, after application and upon cooling, is a thermoset having good initial adhesive strength at room temperature. The term thermoset, as used herein, denotes a material that either will undergo or has undergone a chemical reaction by the action of heat, catalysts, ultraviolet light or other means, leading to a relatively infusible state. Upon curing, the thermoset adhesive composition demonstrates improved organic solvent resistivity, water resistivity and heat resistivity. This thermoset adhesive is more ductile and flexible, provides longer working times, and will bond to most plastics. In addition, the thermoset adhesive compositions provide improved bonding to substrates at ambient temperatures and substrates having smooth surfaces, both of which are generally more difficult to bond.

It will be evident to one skilled in the art of adhesive formulation that other additives such as fillers, reinforcing agents, coupling agents, colorants, odorants, other comohomers, resins, tackifiers, plasticizers, lubricants, stabilizers, antistats, and the like can optionally be added. In addition, antioxidants can be added at any point during the reaction sequence.

The invention will be made clearer by reference to the following examples. These examples are presented for the purpose of illustration and to further set forth the best mode of carrying out the invention. These examples are not to be construed as limiting the appended claims.

EXAMPLE 1

Preparation of a Polyamide Precursor

Amine-terminated piperazine or polyetherdiamine containing polyamides were produced by adding all of the reactive ingredients (acids and amines) into a resin kettle equipped with a stir bar, nitrogen inlet, thermocouple, Barrett trap, and a condenser. The resin was stirred and gradually heated under nitrogen until the mixture reached a temperature of between about 230° C.–250° C., typically a period of about 3 to 5 hours. When the desired temperature was reached, a vacuum was applied. The vacuum and temperature were maintained for another 3 hours. When the reaction was complete, some of the molten polyamide was poured into softening point rings while the rest was poured into an aluminum container to cool. The linear dicarboxylic acids used in the examples were comprised of more than 89% dicarboxylic acids, the remainder being comprised of mono- and polycarboxylic acids, as determined by ion exchange chromatography.

Resin (a): The components used were polymerized fatty acids (UNIDYME 14 from Union Camp Corporation, Wayne, N.J.) (72 equivalent percent), ethylenediamine (25 equivalent percent), sebacic acid (28 equivalent percent), piperazine (77 equivalent percent), and the polyetherdiamine (Jeffamine D-2000 from Texaco Chemical Company, Bellaire, Tex.) (6 equivalent percent). Dioctylated diphenylamine (Vanlube 81 from R.T. Vanderbilt, Norwalk, Conn.) (2 weight percent) a microcrystalline paraffin wax (M-5194 from Moore and Munger Inc., Fairfield, Conn.) (0.5 weight percent), and two drops of phosphoric acid were also added. The resulting polyamide had an acid number of 1.8, an amine number of 8.3, a softening point of 95° C., and a viscosity of 2110 centipoise at 190° C.

Resin (b): The components used were UNIDYME 14 (72 equivalent percent), ethylenediamine (48 equivalent percent), piperazine (60 equivalent percent), and azelaic acid (28 equivalent percent). Vanlube 81 (1.5 weight percent), M-5194 wax (0.5 weight percent) and four drops of phosphoric acid were also added. The resulting polyamide had an acid number of 0.9, an amine number of 7.8, a softening point of 133° C., and a viscosity of 10,480 centipoise at 190° C.

Resin (c): The components used were UNIDYME 14 (87 equivalent percent), ethylenediamine (48 equivalent percent), piperazine (60 equivalent percent), and azelaic acid (13 equivalent percent). Vanlube 81 (1.5 weight percent) and M-5194 wax (0.5 weight percent) were also added. Resin (c) had an acid number of 0.8, an amine number of 5.9, a softening point of 102° C., and a viscosity of 14,120 centipoise at 190° C.

EXAMPLE 2

Curing Reaction of the Polyamide by the Epoxy Resin

The polyamides of Example 1 were cured with the epoxy resin D.E.N. 439, sold by The Dow Chemical Company.

Fifty grams of the polyamide were placed into a metal container. The metal container was put into an oven preheated to a temperature of 190° C. The container was removed when the polyamide became molten. Five grams of D.E.N. 439 were immediately and thoroughly mixed into the polyamide. The resulting mixture was poured onto release paper and allowed to cool. Upon solidification, 27 grams of the mixture was placed into a Carver laboratory press apparatus. The solidified mixture was pressed at 3000 psi, 100° C. for two hours in order to obtain an accelerated cure. Alternatively, the solidified mixture may be pressed for 5 minutes at 100° C. and allowed to cure at room temperature for one week. The pressed cured product was of uniform thickness and was stamped using a mallet and die to obtain samples for tensile tests and disks for dynamic mechanical analysis (DMA). See Table 1.

EXAMPLE 3

Bonding of Substrates

The molten polyamide-epoxy mixtures were used to bond different substrates having smooth surfaces, including wood and various types of plastics. The substrate samples were 1 inch wide by 4 inches long by ⅛ inches thick. The molten adhesive was placed on one substrate surface at ambient temperature. Then, another substrate was placed on top of the adhesive coated surface and pressed together by finger pressure to give a bonded area of 1 square inch. The substrates were then flexed by hand to determine if the bonded substrates were handleable.

If the bonded substrates were handleable, the sample was allowed to set one week at ambient temperature to complete cure. After cure was complete, the bonded substrate was placed in water to determine water resistance. After water soaking for one hour, the samples were flexed by hand to determine bond strength. See Table 1.

TABLE 1

| | Tensile Tests 60° C. after soaking 1 day in 60° C. water | | | | Adhesion Tests | | | |
|---|---|---|---|---|---|---|---|---|
| | Shear Adhesion Failure | Stress at Break | Strain at Break | Melting Point in DMA | Untreated | | Water Soaked After-Assembly | |
| Example | Temp. | (psi) | (%) | Test | Wood | Polycarbonate | Wood | Polycarbonate |
| 1(a) uncured | 71° C. | 30 | 75 | 100° | Bonded | Bonded | Failed | Bonded |
| 2(a) cured | >230° C. | 111 | 268 | * | Bonded | Bonded | Bonded | Bonded |
| 1(b) uncured | 128° C. | 68 | 161 | 140° | Bonded | Failed | Failed | Failed |
| 2(b) cured | >230° C. | 393 | 192 | * | Bonded | Bonded | Bonded | Bonded |
| 1(c) uncured | 84° C. | 61 | 125 | 120° | Bonded | Bonded | Failed | Failed |
| 2(c) cured | >230° C. | 159 | 255 | * | Bonded | Bonded | Bonded | Bonded |

*Does not melt, i.e., thermoset

The bonded wood substrates were bonded with the grain and were further tested with a shear adhesion failure temperature test to determine heat resistance. Table 2 shows the improved adhesion to substrates achieved by these new cured polyamides compared to the adhesion to substrates achieved by a composition prepared in accordance with the prior art.

EXAMPLE 4

Curing of UNI-REZ 2636 by Epoxy Resin

The aminoamide UNI-REZ 2636, (with amine number 3.1, acid number 1.2, a softening point of 134° C. and a viscosity of 5,200 centipoise at 190° C.), made by Union Camp Corporation, was reacted with the epoxy resin D.E.N. 439 using the procedure set forth in Example 2, except that the level of epoxy resin was varied. In Example 4(a), 2.5 g of epoxy resin were added to 50 g. of molten polyamide. In Example 4(b), 5 g of epoxy resin were added to 50 g of molten polyamide. In Example 4(c), 7.5 g of epoxy resin were added to 50 g of molten polyamide. Adhesion samples were made and tested as described in Example 3. See Table 3.

TABLE 2

| Example | Shear Adhesion Failure Temp. | Adhesion Tests | | | | |
|---|---|---|---|---|---|---|
| | | Wood | Polycarbonate | ABS** | Acrylic | Polystyrene |
| 2(a) | >230° C. | Bonded | Bonded | Bonded | Bonded | Bonded |
| 2(b) | >230° C. | Bonded | Bonded | Bonded | Bonded | Bonded |
| 2(c) | >230° C. | Bonded | Bonded | Bonded | Bonded | Bonded |
| (6) Prior Art Example* | 120° C. | Bonded*** | Failed | Failed | Failed | Failed |

*Reproduced Example 1 in U.S. Pat. No. 2,705,223
**Acrylonitrile-butadiene-styrene terpolymer
***Failed if cured for one week at ambient temperature and subsequently soaked in water for one hour.

TABLE 3

| Example | Shear Adhesion Failure Temp. | Adhesion Tests | | | | 60° C. Shear Strength (psi) | Vinyl T-peel Strength, pli | |
|---|---|---|---|---|---|---|---|---|
| | | Untreated | | Water Soaked | | | (23° C.) | (60° C.) |
| | | Wood | Polycarbonate | Wood | Polycarbonate | | | |
| UNI-REZ 2636 (no epoxy added) | 111° C. | Bonded | Bonded | Failed | Failed | 116 | 26 | 3 |
| 4(a) | 192° C. | Bonded | Bonded | Bonded | Bonded | 269 | | |
| 4(b) | >230° C. | Bonded | Bonded | Bonded | Bonded | 334 | 40 | 28 |
| 4(c) | 178° C. | Bonded | Bonded | Bonded | Bonded | 237 | — | — |
| 5 | >230° C. | Bonded | Bonded | Bonded | Bonded | 250 | — | — |
| (6) Prior Art Example* | 120° C. | Bonded | Failed | Failed | Failed | — | 0 | 0 |

*Reproduced Example 1 in U.S. Pat. No. 2,705,223

EXAMPLE 5

Preparation of Cured Polyamide Using a Static Mixer

The cured polyamide may be prepared by a continuous mixing process which uses a static mixer. UNI-REZ 2636 and D.E.N. 439 were separately melted in a Nordson Model 115 hot melt applicator. The polyamide was heated to 190° C. and the epoxy resin was heated to 150° C. and each was fed into the static mixer in a 10:1 weight ratio of polyamide to epoxy. The product from the discharge nozzle of the static mixer was treated as set forth in Examples 2 and 3. See Table 3 for the results of the testing of the product of Example 5.

EXAMPLE 6

Prior Art Product

The polyamide and polyamide-epoxy mixtures were prepared using the method set forth in Example 1 of U.S. Pat. No. 2,705,223. The product was then subjected to the testing described in Example 3 above and the results are reported in Tables 2 and 3. As the data shows, the properties of the adhesive of the present invention are superior to those prepared in accordance with the prior art.

What is claimed is:

1. An improved two-component hot-melt thermoset adhesive composition comprising:
   (1) a thermoplastic, amine terminated piperazine containing polyamide resin, said polyamide resin having a softening point above 50° C., having an amine plus acid number greater than about 1 and less than about 50 and having an excess of amine to acid groups, and optionally comprising a polyetherdiamine-containing polyamine;
   wherein said piperazine component has secondary amine groups and excludes primary amine groups, and
   (2) an epoxy resin, said epoxy resin having at least two epoxy groups per molecule of epoxy resin;
   the initial ratio of epoxy groups of said epoxy resin to the free amine groups of said polyamide resin being greater than about 1 to 1 and less than about 10 to 1.

2. The composition of claim 1 wherein said piperazine containing polyamide resin is derived from at least one polymerized fatty acid, at least one acid selected from the group consisting of linear dicarboxylic acids and monocarboxylic acids, at least one linear or branched aliphatic polyamine, and a piperazine-containing polyamine.

3. The composition of claim 2 wherein said linear dicarboxylic acid is selected from the group consisting of oxalic, malonic, succinic, suberic, adipic, azelaic, sebacic, and dodecanedioic acids.

4. The composition of claim 3 wherein said linear dicarboxylic acid is selected from the group consisting of adipic, azelaic, sebacic, and dodecanedioic acids.

5. The composition of claim 2 wherein said monocarboxylic acid is selected from the group consisting of stearic, tall oil fatty and oleic acids.

6. The composition of claim 2 wherein said linear or branched aliphatic polyamine is selected from the group consisting of diaminopropane, diaminobutane, diaminopentane, methylpentamethylenediamine, methylnonanediamine, diethylenetriamine, triethyltetraamine, tetraethylenepentaamine, ethylenediamine, and hexamethylenediamine.

7. The composition of claim 6 wherein said linear or branched aliphatic polyamine is selected from the group consisting of ethylenediamine, and hexamethylenediamine.

8. The composition of claim 1 wherein said epoxy resin has at least two epoxy and no more than eight epoxy groups per molecule of epoxy resin.

9. The composition of claim 1 wherein said polyamide resin has an amine plus acid number less than about 30.

10. The composition of claim 1 wherein said polyamide resin has an amine plus acid number less than about 20.

11. The composition of claim 1 wherein said ratio of epoxy groups to free amine groups is greater than about 2 to 1 and less than about 6 to 1.

12. The composition of claim 1 wherein said polyamide resin has an amine plus acid number less than about 20, said epoxy resin has at least two epoxy and no more than eight epoxy groups per molecule of epoxy resin, and said ratio of epoxy groups to free amine groups is greater than about 1 to 1 and less than about 5 to 1.

* * * * *

UNITED STATES PATENT AND TRADEMARK OFFICE
CERTIFICATE OF CORRECTION

PATENT NO. : 5,424,371
DATED : June 13, 1995
INVENTOR(S) : Charles R. Frihart, et. al.

It is certified that error appears in the above-indentified patent and that said Letters Patent is hereby corrected as shown below:

Title page, after item [22] and before item [51] insert --Related U. S. Application Data: Continuation of Ser. No. 824,748, January 17, 1992, which is a continuation of Der. No. 479,830, February 14, 1990--.

Signed and Sealed this

Twenty-first Day of November, 1995

Attest:

BRUCE LEHMAN

*Attesting Officer*   *Commissioner of Patents and Trademarks*